US011776253B2

(12) United States Patent
Anvaripour et al.

(10) Patent No.: US 11,776,253 B2
(45) Date of Patent: Oct. 3, 2023

(54) DISPLAYING OBJECT NAMES IN ASSOCIATION WITH AUGMENTED REALITY CONTENT

(71) Applicant: Snap Inc., Santa Monica, CA (US)

(72) Inventors: Kaveh Anvaripour, Santa Monica, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/204,712

(22) Filed: Mar. 17, 2021

(65) Prior Publication Data

US 2021/0303860 A1 Sep. 30, 2021

Related U.S. Application Data

(60) Provisional application No. 63/000,762, filed on Mar. 27, 2020.

(51) Int. Cl.

| | |
|---|---|
| *G06V 20/20* | (2022.01) |
| *G06T 19/00* | (2011.01) |
| *G06F 16/9532* | (2019.01) |
| *H04L 51/046* | (2022.01) |

(Continued)

(52) U.S. Cl.
CPC .......... *G06V 20/20* (2022.01); *G06F 16/9532* (2019.01); *G06F 16/9538* (2019.01); *G06T 19/006* (2013.01); *H04L 51/046* (2013.01); *G06F 16/955* (2019.01)

(58) Field of Classification Search
CPC .............. G06K 9/00671; G06F 16/955; G06F 16/9532; G06F 16/9538; G06T 19/006; H04L 51/10; H04L 51/20; H04L 51/32; H04L 51/046; H04L 51/222; H04L 51/52; G06V 20/20
See application file for complete search history.

(56) References Cited

U.S. PATENT DOCUMENTS

| | | | |
|---|---|---|---|
| 10,699,123 B1 * | 6/2020 | Charlton | G06T 11/60 |
| 10,916,241 B1 * | 2/2021 | Edwards | H04W 4/021 |
| 11,120,093 B1 * | 9/2021 | Cuan | G06T 11/00 |

(Continued)

FOREIGN PATENT DOCUMENTS

CN 102843349 B * 3/2018 ............. G06F 3/011

*Primary Examiner* — Chante E Harrison
(74) *Attorney, Agent, or Firm* — Schwegman Lundberg & Woessner, P.A.

(57) ABSTRACT

Aspects of the present disclosure involve a system comprising a computer-readable storage medium storing a program and method for displaying object names in association with augmented reality content. The program and method provide for receiving, by a messaging application running on a device, a first request to identify plural objects based on an image captured by a camera of the device; identifying, in response to receiving the first request, the plural objects based on the image; for each of the plural objects, determining at least one attribute of the object, and calculating a number of augmented reality content items, from plural augmented reality content items, corresponding to the at least one attribute of the object; selecting, from the plural objects, an object with a largest calculated number of corresponding augmented reality content items; and displaying a name for each of the plural objects based on the selecting.

18 Claims, 10 Drawing Sheets

(51) Int. Cl.
    *G06F 16/9538*    (2019.01)
    *G06F 16/955*     (2019.01)

(56) References Cited

U.S. PATENT DOCUMENTS

| | | | |
|---|---|---|---|
| 11,288,712 B2* | 3/2022 | Roebuck | G06Q 30/0278 |
| 2014/0362111 A1* | 12/2014 | Kim | G06T 19/006 |
| | | | 345/633 |
| 2016/0294762 A1* | 10/2016 | Miller | H04L 65/4084 |
| 2017/0206431 A1* | 7/2017 | Sun | G06F 16/5838 |
| 2018/0253901 A1* | 9/2018 | Charlton | G06T 19/006 |
| 2019/0122046 A1* | 4/2019 | Wantland | G06K 9/726 |
| 2019/0213410 A1* | 7/2019 | Masuko | G06V 10/40 |
| 2020/0143166 A1* | 5/2020 | Jung | G06K 9/00671 |
| 2020/0265613 A1* | 8/2020 | Yoon | H04M 1/725 |
| 2020/0311116 A1* | 10/2020 | Anvaripour | G06F 16/44 |
| 2020/0320385 A1* | 10/2020 | Yang | G06N 3/084 |
| 2020/0342669 A1* | 10/2020 | Nattinger | G06K 9/6271 |
| 2021/0150611 A1* | 5/2021 | Morin | G06Q 30/0256 |
| 2021/0272117 A1* | 9/2021 | Ene | G06F 21/6218 |
| 2021/0304451 A1* | 9/2021 | Fortier | G06K 9/00302 |

\* cited by examiner

DISPLAYING OBJECT NAMES IN ASSOCIATION WITH AUGMENTED REALITY CONTENT

CROSS-REFERENCE TO RELATED APPLICATION

This patent application claims the benefit of U.S. Provisional Patent Application No. 63/000,762, filed Mar. 27, 2020, entitled "DISPLAYING OBJECT NAMES IN ASSOCIATION WITH AUGMENTED REALITY CONTENT", which is incorporated by reference herein in its entirety.

TECHNICAL FIELD

The present disclosure relates generally to messaging applications, including providing display of augmented reality content within a messaging application.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A messaging system typically allow users to exchange content items (e.g., messages, images and/or video) with one another in a message thread. A messaging system may implement or otherwise work in conjunction with an augmented reality system to display augmented reality content with respect to messaging. For example, the augmented reality content is combined with image data captured by a device camera in creating message content. However, a user may wish for facilitated creation and/or selection of augmented reality content with respect to messaging.

The disclosed embodiments provide for a messaging application to display the names of objects identified in a captured image. The messaging application receives user input to perform a scan operation, in order to identify multiple objects depicted in an image captured by a device camera. The messaging application selects one of the identified objects that corresponds with the largest number of available augmented reality content items (e.g., corresponding to applying augmented reality experiences or Lenses). For example, selecting the object is based on comparing attribute(s) of each object with predefined attribute(s) of the augmented reality content items. In addition, the messaging application identifies an augmented reality content item that most closely corresponds with the selected object.

The messaging application displays the names of all of the identified objects, for example, with the name of the selected object being displayed last. Moreover, the messaging application displays the image captured by the device camera with the identified augmented reality content item.

Figure 1:
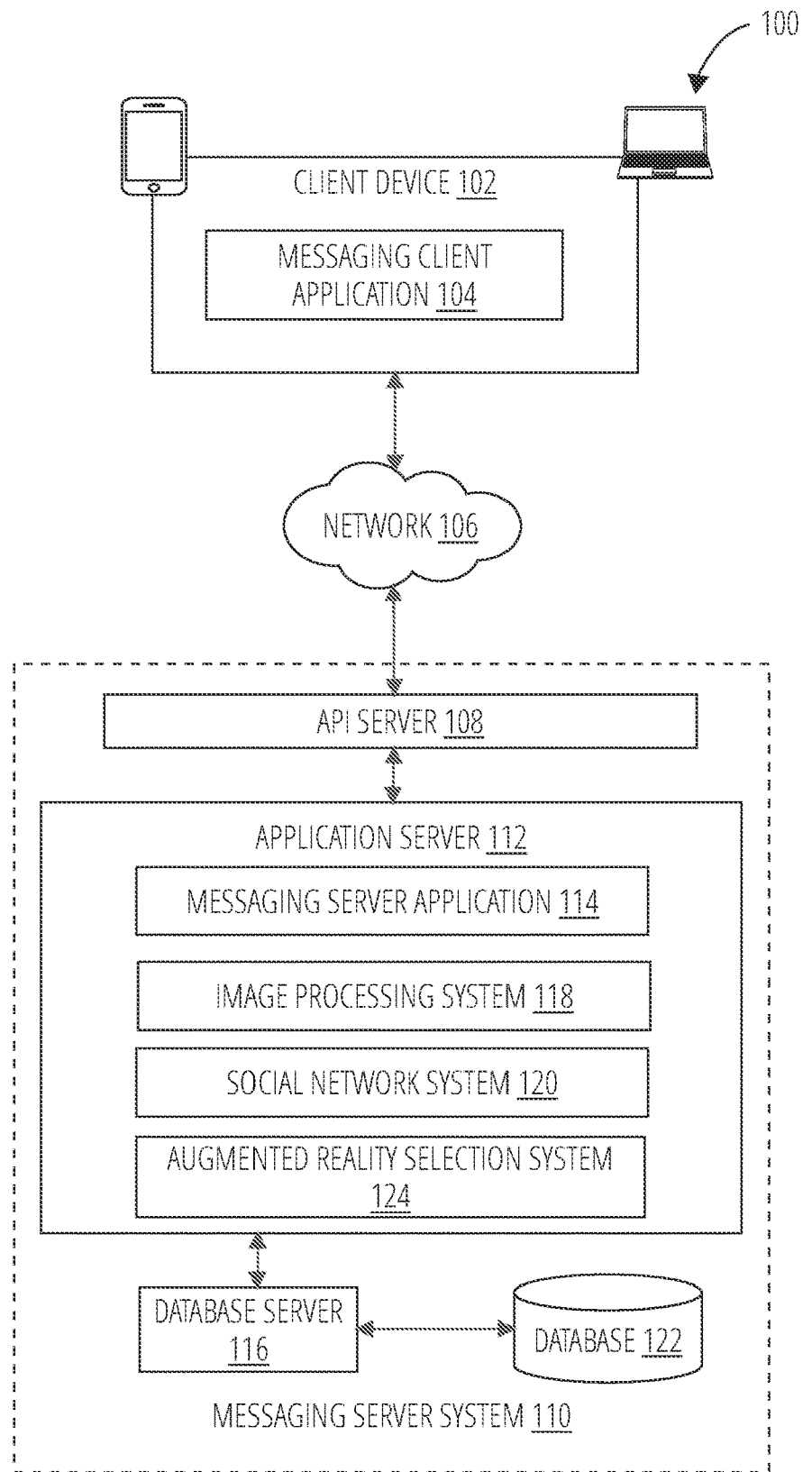
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network 106. The messaging system 100 includes instances of a client device 102, each of which hosts a messaging client application 104. Each messaging client application 104 is communicatively coupled to other instances of the messaging client application 104 and a messaging server system 110 via a network 106 (e.g., the Internet).

A messaging client application 104 is able to communicate and exchange data with another messaging client application 104 and with the messaging server system 110 via the network 106. The data exchanged between the messaging client application 104, and between the other messaging client application 104 and the messaging server system 110, includes functions (e.g., commands to invoke functions) as well as payload data (e.g., text, audio, video or other multimedia data).

In some embodiments, the messaging client application 104 activates a camera of the client device 102 (e.g., upon startup of the messaging client application 104). The messaging client application 104 allows a user to request to scan one or more items in a camera feed captured by the camera. In one or more embodiments, the messaging client application 104 may detect physical contact between a finger of the user's hand and a region of the touch screen for a threshold period of time. For example, the messaging client application 104 determines that the user touched and held their finger on the screen for a threshold time (e.g., two seconds). In an alternative embodiment, the messaging client application 104 may receive a user selection of a dedicated scan option (e.g., a button) presented together with the camera feed. In response, the messaging client application 104 captures an image being displayed on the screen and processes the image to identify one or more objects in the image. In some embodiments, the messaging client application 104 uses one or more trained classifiers and/or environmental factors to identify the objects in the image.

The messaging server system 110 provides server-side functionality via the network 106 to a particular messaging client application 104. While certain functions of the messaging system 100 are described herein as being performed by either the messaging client application 104 or by the messaging server system 110, it will be appreciated that the location of certain functionality either within the messaging client application 104 or the messaging server system 110 is a design choice. For example, it may be technically preferable to initially deploy certain technology and functionality within the messaging server system 110, but to later migrate this technology and functionality to the messaging client application 104 where a client device 102 has a sufficient processing capacity.

The messaging server system 110 supports various services and operations that are provided to the messaging client application 104. Such operations include transmitting data to, receiving data from, and processing data generated by the messaging client application 104. This data may include message content, client device information, graphical elements, geolocation information, media annotation and overlays, virtual objects, message content persistence conditions, social network information, and live event information, as examples. Data exchanges within the messaging system 100 are invoked and controlled through functions available via user interfaces (UIs) (e.g., graphical user interfaces) of the messaging client application 104.

Turning now specifically to the messaging server system 110, an API server 108 (application programming interface server) is coupled to, and provides a programmatic interface to, an application server 112. The application server 112 is communicatively coupled to a database server 116, which facilitates access to a database 122 in which is stored data associated with messages processed by the application server 112.

Dealing specifically with the API server 108, this server receives and transmits message data (e.g., commands and message payloads) between the client device 102 and the application server 112. Specifically, the API server 108 provides a set of interfaces (e.g., routines and protocols) that can be called or queried by the messaging client application 104 in order to invoke functionality of the application server 112. The API server 108 exposes various functions supported by the application server 112, including account registration; login functionality; the sending of messages, via the application server 112, from a particular messaging client application 104 to another messaging client application 104; the sending of media files (e.g., graphical elements, images or video) from the messaging client application 104 to the messaging server application 114, and for possible access by another messaging client application 104; a graphical element list; the setting of a collection of media data (e.g., a Story); the retrieval of such collections; the retrieval of a list of friends of a user of a client device 102; maintaining augmented reality content items; the retrieval of messages and content; the adding and deleting of friends to a social graph; the location of friends within a social graph; access to user conversation data; access to avatar information stored on messaging server system 110; and opening an application event (e.g., relating to the messaging client application 104).

The application server 112 hosts a number of applications and subsystems, including a messaging server application 114, an image processing system 118, a social network system 120, and augmented reality selection system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called Stories or galleries). These collections are then made available, by the messaging server application 114, to the 10. Other processor- and memory-intensive processing of data may also be performed server-side by the messaging server application 114, in view of the hardware requirements for such processing.

The application server 112 also includes an image processing system 118 that is dedicated to performing various image processing operations, typically with respect to images or video received within the payload of a message at the messaging server application 114. In one or more implementations, a portion of the image processing system 118 may also be implemented by the augmented reality selection system 124.

The social network system 120 supports various social networking functions and services and makes these functions and services available to the messaging server application 114. To this end, the social network system 120 maintains and accesses an entity graph within the database 122. Examples of functions and services supported by the social network system 120 include the identification of other users of the messaging system 100 with which a particular user has relationships or is "following" and also the identification of other entities and interests of a particular user. Such other users may be referred to as the user's friends. The social network system 120 may access location information associated with each of the user's friends to determine where they live or are currently located geographically. The social network system 120 may maintain a location profile for each of the user's friends indicating the geographical location where the user's friends live.

The messaging client application 104 includes a set of functions that allows the client device 102 to access the augmented reality selection system 124. The augmented reality selection system 124 generates and maintains a list of augmented reality content items. The augmented reality content items may correspond to applying augmented reality experiences (e.g., Lenses) for supplementing captured image data with augmented reality content.

In one or more embodiments, the augmented reality selection system 124 identifies objects depicted in the one or more images captured by the messaging client application 104, and determines one or more attributes for each detected object. The augmented reality selection system 124 searches for one or more augmented reality content items (e.g., virtual objects) that are associated with the one or more attributes of the objects, and ranks the virtual objects (e.g., based on the associations and weights assigned to each of the attributes). The augmented reality selection system 124 causes one or more virtual objects or graphical elements of the highest-ranked augmented reality content item to be presented on top of the captured image (e.g., with respect to the most relevant detected object).

The application server 112 is communicatively coupled to a database server 116, which facilitates access to a database 122, in which is stored data associated with messages processed by the messaging server application 114. The database 122 may be a third-party database. For example, the application server 112 may be associated with a first entity, and the database 122 or a portion of the database 122 may be associated and hosted by a second different entity. In some embodiments, the database 122 stores user data that the first entity collects about various each of the users of a service provided by the first entity. For example, the user data includes user names, phone numbers, passwords, addresses, friends, activity information, preferences, videos or content consumed by the user, and so forth.

Figure 2:
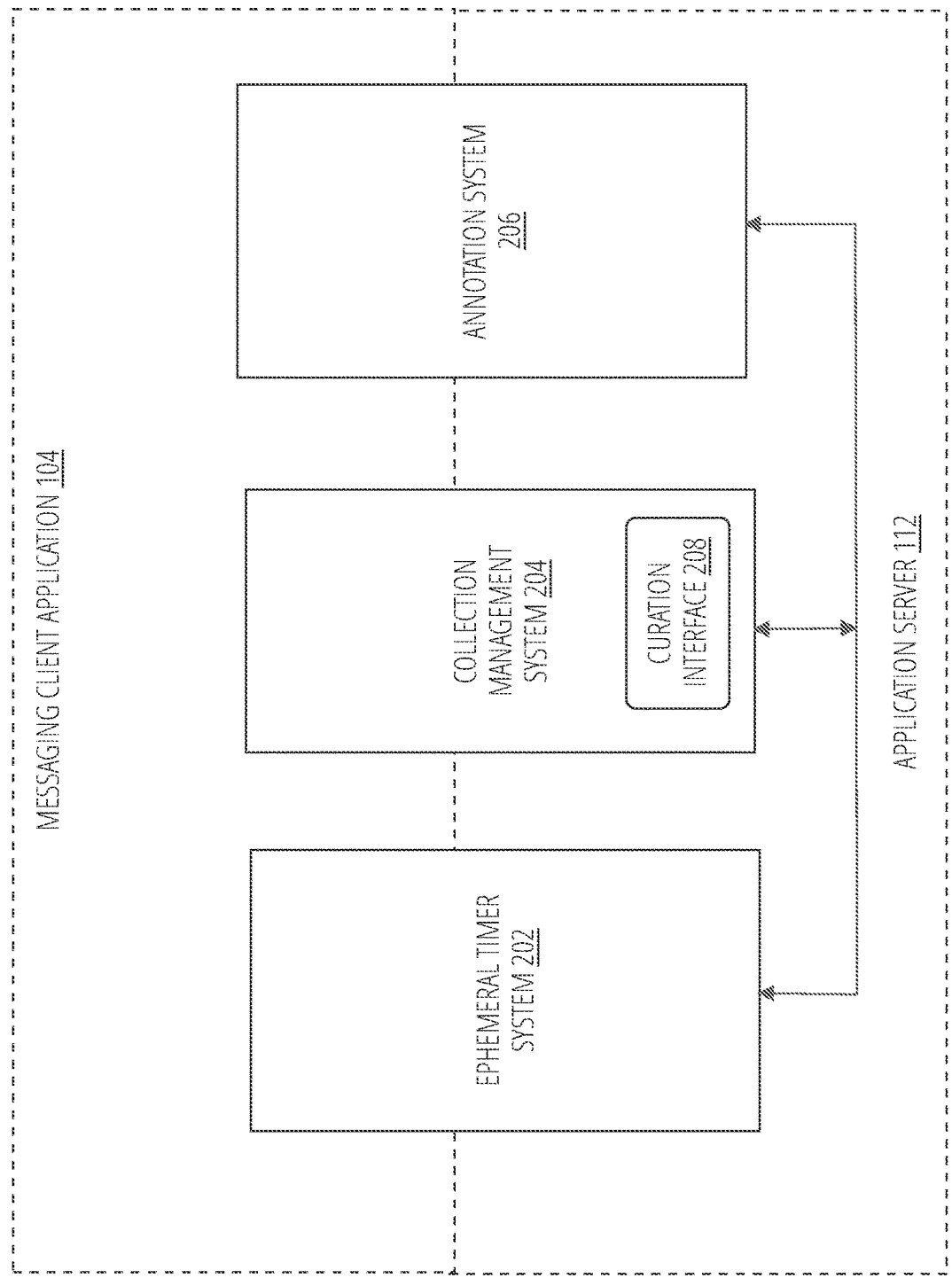
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a Story), selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a content item (e.g., a photo) at the client device 102. For example, the media overlay may include text that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 122 and accessed through the database server 116.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
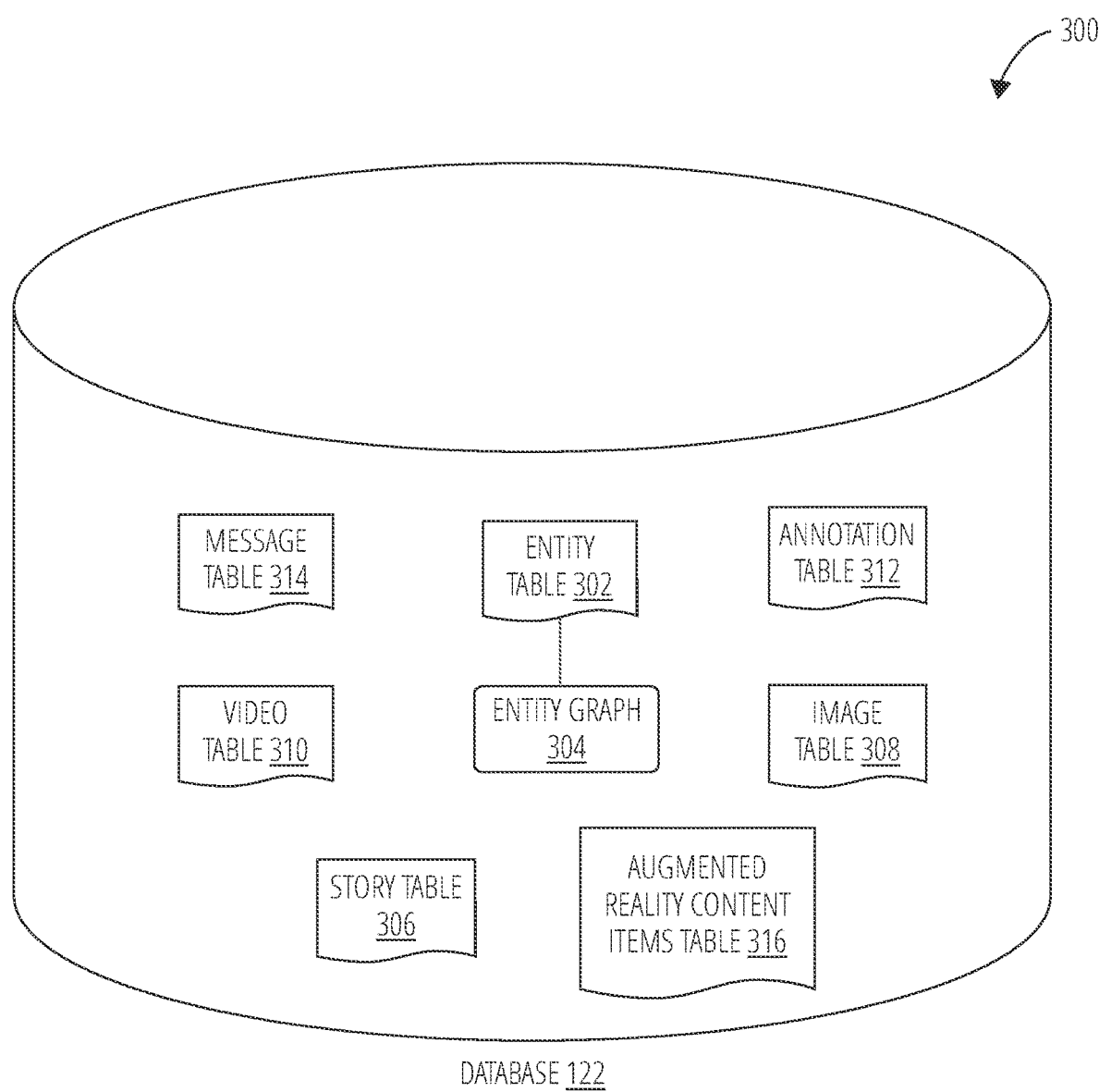
FIG. 3 is a diagrammatic representation of a data structure as maintained in a database, in accordance with some example embodiments.

FIG. 3 is a schematic diagram illustrating data structures 300 which may be stored in the database 122 of the messaging server system 110, according to certain example embodiments. While the content of the database 122 is shown to comprise a number of tables, it will be appreciated that the data could be stored in other types of data structures (e.g., as an object-oriented database).

The database 122 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 110 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization), interest-based, or activity-based, merely for example.

The message table 314 may store a collection of conversations between a user and one or more friends or entities. The message table 314 may include various attributes of each conversation, such as the list of participants, the size of the conversation (e.g., number of users and/or number of messages), the chat color of the conversation, a unique identifier for the conversation, and any other conversation related feature(s).

The database 122 also stores annotation data, in the example form of filters, in an annotation table 312. The database 122 also stores annotated content received in the annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 308 are augmented reality content items (e.g., corresponding to applying augmented reality experiences or Lenses). An augmented reality content item may be a real-time special effect and sound that may be added to an image or a video.

As described above, augmented reality content items, overlays, image transformations, AR images and similar terms refer to modifications that may be made to videos or images. This includes real-time modification which modifies an image as it is captured using a device sensor and then displayed on a screen of the device with the modifications. This also includes modifications to stored content, such as video clips in a gallery that may be modified. For example, in a device with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a device would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a three-dimensional mesh model of the object or objects, and using transformations and animated textures of the model within the video to achieve the transformation. In other embodiments, tracking of points on an object may be used to place an image or texture (which may be two dimensional or three dimensional) at the tracked position. In still further embodiments, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some embodiments, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each of element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In one or more embodiments, transformations changing some areas of an object using its elements can be performed by calculating of characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some embodiments of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other embodiments, other methods and algorithms suitable for face detection can be used. For example, in some embodiments, features are located using a landmark which represents a distinguishable point present in most of the images under consideration. For facial landmarks, for example, the location of the left eye pupil may be used. In an initial landmark is not identifiable (e.g., if a person has an eyepatch), secondary landmarks may be used. Such landmark identification procedures may be used for any such objects. In some embodiments, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some embodiments, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable and the shape model pools the results of the weak template matchers to form a stronger overall classifier. The entire search is repeated at each level in an image pyramid, from coarse to fine resolution.

Embodiments of a transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some example embodiments, a computer animation model to transform image data can be used by a system where a user may capture an image or video stream of the user (e.g., a selfie) using a client device 102 having a neural network operating as part of a messaging client application 104 operating on the client device 102. The transform system operating within the messaging client application 104 determines the presence of a face within the image or video stream and provides modification icons associated with a computer animation model to transform image data, or the computer animation model can be present as associated with an interface described herein. The modification icons include changes which may be the basis for modifying the user's face within the image or video stream as part of the modification operation. Once a modification icon is selected, the transform system initiates a process to convert the image of the user to reflect the selected modification icon (e.g., generate a smiling face on the user). In some embodiments, a modified image or video stream may be presented in a graphical user interface displayed on the mobile client device as soon as the image or video stream is captured and a specified modification is selected. The transform system may implement a complex convolutional neural network on a portion of the image or video stream to generate and apply the selected modification. That is, the user may capture the image or video stream and be presented with a modified result in real time or near real time once a modification icon has been selected. Further, the modification may be persistent while the video stream is being captured and the selected modification icon remains toggled. Machine taught neural networks may be used to enable such modifications.

In some embodiments, the graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified or such modifications may be individually toggled by tapping or selecting the individual face or a series of individual faces displayed within the graphical user interface.

As mentioned above, the video table 310 stores video data which, in one embodiment, is associated with messages for which records are maintained within the message table 314. Similarly, the image table 308 stores image data associated with messages for which message data is stored in the entity table 302. The entity table 302 may associate various annotations from the annotation table 312 with various images and videos stored in the image table 308 and the video table 310.

The augmented reality content items table 316 stores an indication (e.g., a list) of augmented reality content items available for selection and activation by the messaging client application 104. In one or more embodiments, each augmented reality content item in the augmented reality content items table 316 is associated with one or more object attributes. Each augmented reality content item in the augmented reality content items table 316 may also be associated with one or more predefined words (e.g., using metadata labels, designations, and the like). In one or more embodiments, the messaging client application 104 searches the object attributes and/or predefined words stored in the augmented reality content items table 316 to identify one or more augmented reality content items associated with a scanned object or an object identified in a captured image. Each augmented reality content item stored and/or referenced in the augmented reality content items table 316 includes one or more graphical elements or virtual objects which may or may not be animated. Each augmented reality content item also includes instructions on where to position the graphical elements or virtual objects relative to other objects depicted in the captured image.

A story table 306 stores data regarding collections of messages and associated image, video, or audio data, which are compiled into a collection (e.g., a Story or a gallery). The creation of a particular collection may be initiated by a particular user (e.g., each user for which a record is maintained in the entity table 302). A user may create a "personal Story" in the form of a collection of content that has been created and sent/broadcast by that user. To this end, the UI of the messaging client application 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from various locations and events. Users whose client devices have location services enabled and are at a common location event at a particular time may, for example, be presented with an option, via a UI of the messaging client application 104, to contribute content to a particular live Story. The live Story may be identified to the user by the messaging client application 104 based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some embodiments, a contribution to a location Story may require a second degree of authentication to verify that the end user belongs to a specific organization or other entity (e.g., is a student on the university campus).

Figure 4:
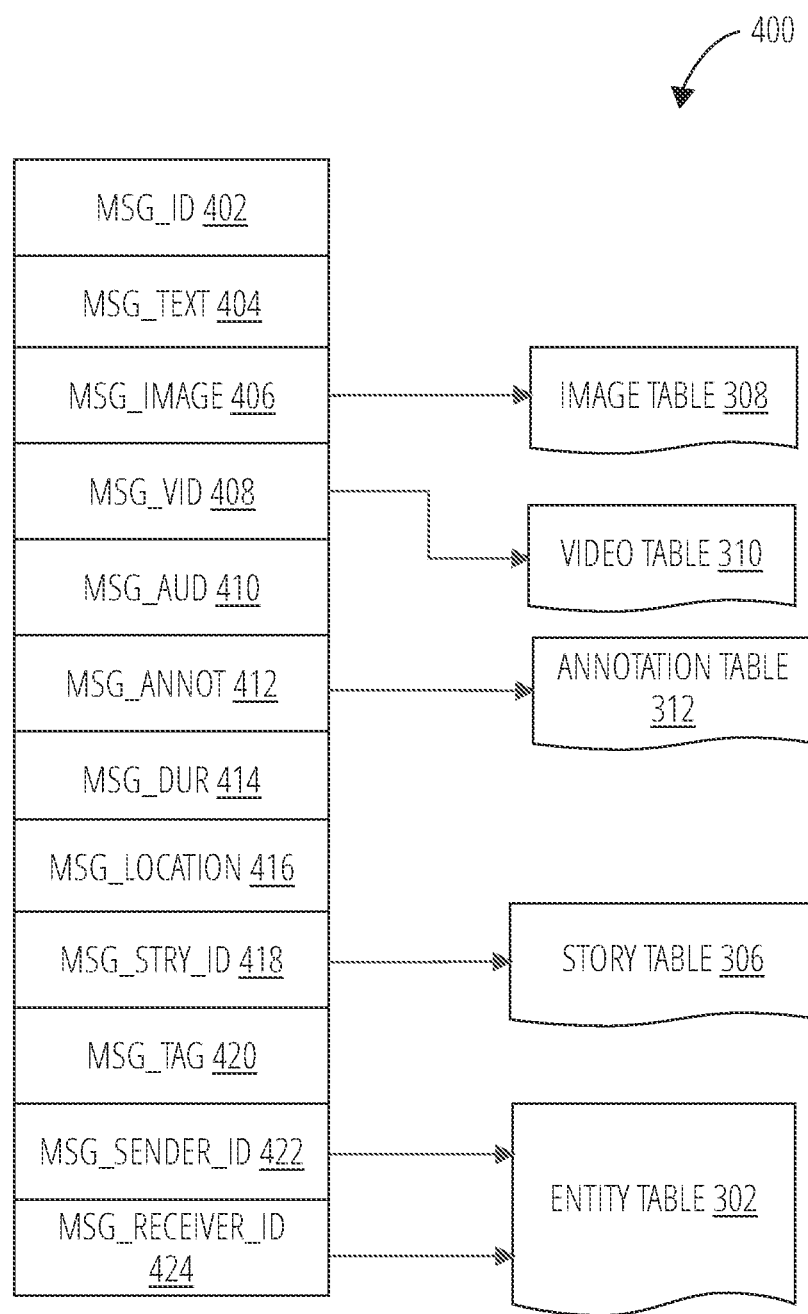
FIG. 4 is a diagrammatic representation of a message, in accordance with some example embodiments.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 122, accessible by the messaging server application 114. Similarly, the content of a message 400 is stored in memory as "in-transit" or "in-flight" data of the client device 102 or the application server 112. The message 400 is shown to include the following components:

- A message identifier 402: a unique identifier that identifies the message 400.
- A message text payload 404: text, to be generated by a user via a user interface of the client device 102 and that is included in the message 400.
- A message image payload 406: image data, captured by a camera component of a client device 102 or retrieved from a memory component of a client device 102, and that is included in the message 400.
- A message video payload 408: video data, captured by a camera component or retrieved from a memory component of the client device 102 and that is included in the message 400.
- A message audio payload 410: audio data, captured by a microphone or retrieved from a memory component of the client device 102, and that is included in the message 400.
- Message annotations 412: annotation data (e.g., filters, stickers or other enhancements) that represents annotations to be applied to message image payload 406, message video payload 408, or message audio payload 410 of the message 400.
- A message duration parameter 414: parameter value indicating, in seconds, the amount of time for which content of the message (e.g., the message image payload 406, message video payload 408, message audio payload 410) is to be presented or made accessible to a user via the messaging client application 104.
- A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- A message story identifier 418: identifier values identifying one or more content collections (e.g., "Stories") with which a particular content item in the message image payload 406 of the message 400 is associated. For example, multiple images within the message image payload 406 may each be associated with multiple content collections using identifier values.
- A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 308. Similarly, values within the message video payload 408 may point to data stored within a video table 310, values stored within the message annotations 412 may point to data stored in an annotation table 312, values stored within the message story identifier 418 may point to data stored in a story table 306, and values stored within the message sender identifier 422 and the message receiver identifier 424 may point to user records stored within an entity table 302.

Figure 5:
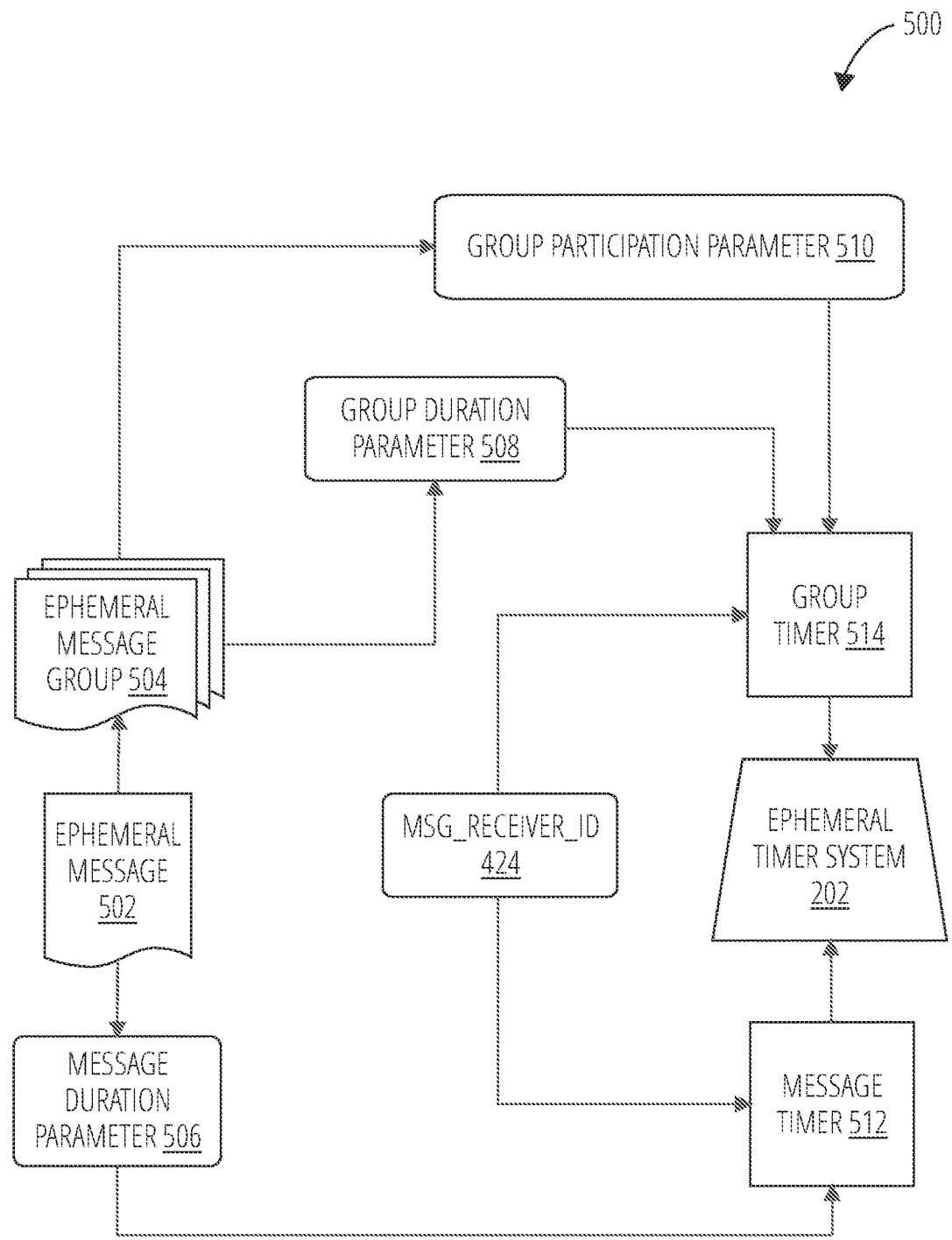
FIG. 5 is a flowchart for an access-limiting process, in accordance with some example embodiments.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal Story, or an event Story). The ephemeral message group 504 has an associated group duration parameter 508, a value of which determines a time-duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514 which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one embodiment, each and every ephemeral message 502 within the ephemeral message group 504 remains viewable and accessible for a time-period specified by the group duration parameter 508. In a further embodiment, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 either when the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client application 104) to cause an indicium (e.g., an icon) associated with the relevant ephemeral message group 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
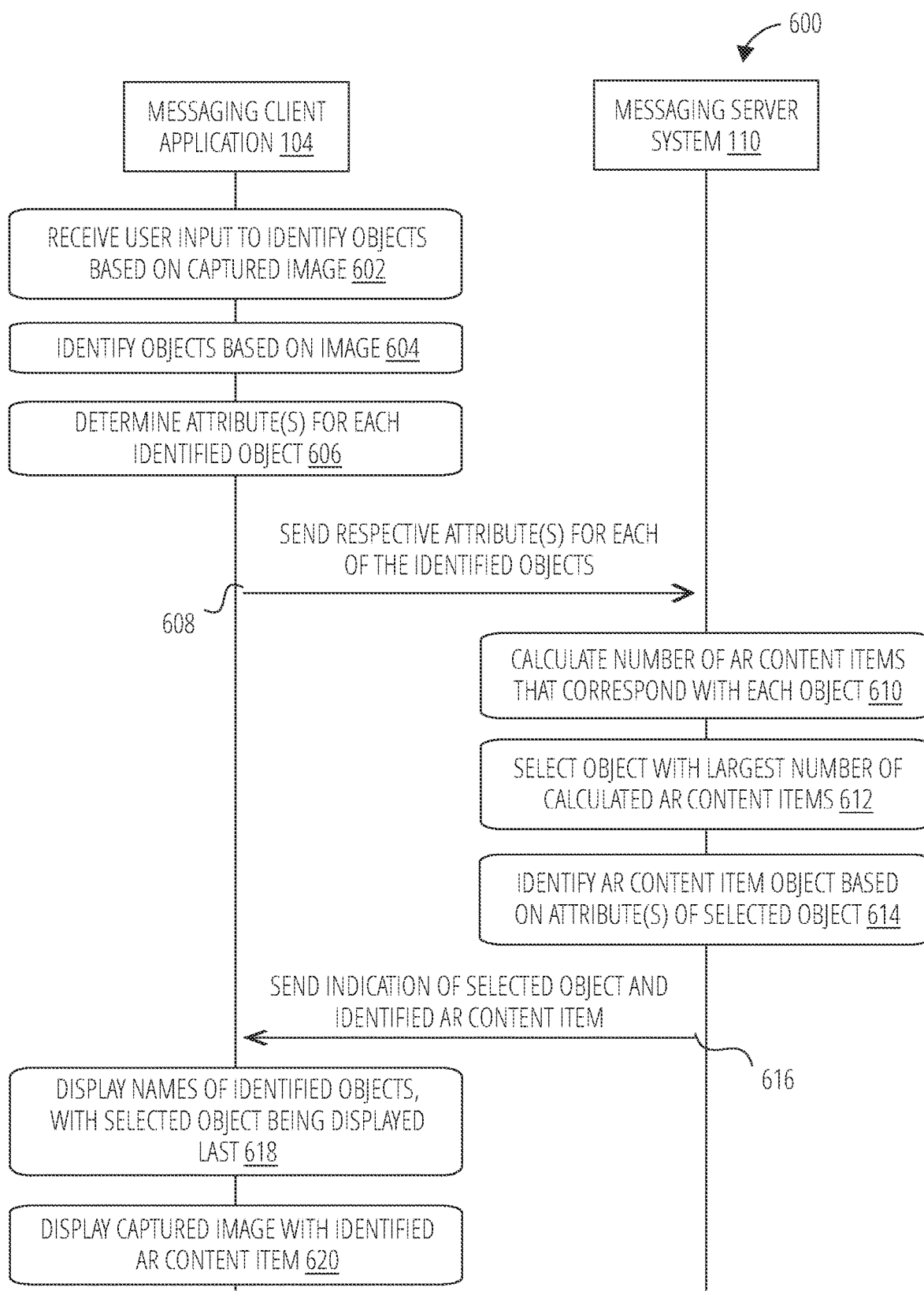
FIG. 6 is an interaction diagram illustrating a process for displaying the names of objects identified in a captured image in association with displaying augmented reality content, in accordance with some example embodiments.

FIG. 6 is an interaction diagram illustrating a process 600 for displaying the names of objects identified in a captured image in association with displaying augmented reality content, in accordance with some example embodiments. For explanatory purposes, the process 600 is primarily described herein with reference to the messaging client application 104 of the client device 102, and the messaging server system 110 of FIG. 1. However, one or more blocks (or operations) of the process 600 may be performed by one or more other components, and/or by other suitable devices. Further for explanatory purposes, the blocks of the process 600 are described herein as occurring in serial, or linearly. However, multiple blocks of the process 600 may occur in parallel. In addition, the blocks of the process 600 need not be performed in the order shown and/or one or more blocks of the process 600 need not be performed and/or can be replaced by other operations.

As described herein, the messaging client application 104 is configured to display the names of objects identified in a captured image. In particular, the messaging client application 104 receives user input to perform a scan operation, in order to identify multiple objects depicted in an image captured by a camera of the client device 102. The messaging client application 104, in conjunction with the messaging server system 110, selects an object that corresponds with the largest number of available augmented reality content items (e.g., based on comparing attribute(s) of the object with predefined attribute(s) of the augmented reality content items). In addition, messaging server system 110 identifies an augmented reality content item (e.g., corresponding to an augmented reality experience) that most closely corresponds with the selected object (e.g., based on the comparison). The messaging client application 104 displays the names of all of the identified objects, with the name of the selected object being displayed last. Moreover, the messaging client application 104 displays the image captured by the device camera with the identified augmented reality content item.

Thus, at block 602, the messaging client application 104 receives user input to identify objects based on an image captured by a camera of the client device 102. In response, the messaging client application 104 identifies the objects based on the captured image data (block 604).

As noted above, the messaging client application 104 may activate the camera of the client device 102 (e.g., upon startup of the messaging client application 104). The messaging client application 104 allows a user to request to scan one or more items in a camera feed captured by the camera. In one or more embodiments, the messaging client application 104 detects physical contact between a finger of the user's hand and a region of the touch screen for a threshold period of time. For example, the messaging client application 104 determines that the user touched and held their finger on the screen for a threshold time (e.g., two seconds). In an alternative embodiment, the messaging client application 104 receives a user selection of a dedicated scan option (e.g., a button) presented together with the camera feed. In response, the messaging client application 104 captures an image being displayed on the screen and processes the image to identify multiple objects based in the image.

For example, the messaging client application 104 is configured to implement or otherwise access object recognition algorithms (e.g., including machine learning algorithms) configured to scan a captured image, and to detect/track the movement of objects within the image. By way of non-limiting example, detectable objects within an image include: a human face, parts of a human body, animals and parts thereof, landscapes, objects in nature, non-living objects (e.g., chairs, books, cars, buildings, other structures), illustrations of objects (e.g., on posters and/or flyers), text-based objects, equation-based objects and the like.

The messaging client application 104 determines one or more attributes for each of the identified objects (block 606). In this regard, the messaging client application 104 is configured to determine or otherwise access attributes of the identified objects, such as a name, type, genre, color, size, shape, texture, geolocation and/or other supplemental information (e.g., a song title/artist for an object corresponding to media).

The messaging client application 104 sends the respective attribute(s) for each of the identified objects to the messaging server system 110 (operation 608). For example, the messaging client application 104 sends the name of each object (e.g., and/or other attribute(s), such as geolocation and supplemental information) to the messaging server system 110.

In response, the messaging server system 110 calculates the number of corresponding augmented reality content items for each of the objects (block 610). In one or more embodiments, the messaging server system 110 is configured to search a set of available augmented reality content items, by comparing the attribute(s) for each with respective attributes and/or predefined words associated each of the available augmented reality content items.

As noted above, the augmented reality content items table 316 included in the database 122 is configured to designate or label each augmented reality content item (e.g., via metadata) with respective attributes and/or predefined word(s) to search the augmented reality content item. Thus, in one or more embodiments, the messaging server system 110 queries the database 122 with the attributes for each object, and the database 122 may provide one or more augmented reality content items ((e.g., corresponding to augmented reality experiences) as a result to the query.

As such, messaging server system 110 is configured to calculate the number of augmented reality content items corresponding to each object, per block 610. In addition, the messaging server system 110 selects the object with the largest number of calculated augmented reality content items (block 612).

Moreover, at block 614, the messaging server system 110 identifies an augmented reality content based on the attribute(s) of the selected object from block 612. For example, in querying the database 122 with the attribute(s) of the selected object, the database 122 may have returned multiple augmented reality content items. In one or more implementations, the database 122 may be configured to rank the multiple augmented reality content items (e.g., based on a number of matches, and/or weights assigned to one of more of the object attributes, the augmented reality content items attributes, and/or the predefined words).

The database 122 may provide an indication of the ranking to the messaging server system 110 as the result to the query. Alternatively or in addition, the database 122 may return the highest-ranked augmented reality content item to the messaging server system 110 as a result to the query. Thus, the messaging server system 110 sends an indication of the selected object (from block 612), and an indication of the identified augmented reality content item (e.g., from the result of the query) to the messaging client application 104 (operation 616).

The messaging client application 104 displays the names of the identified objects, with the selected object being displayed last (block 618). In one or more implementations, the messaging client application 104 is configured to display names for a preset number of objects (e.g., three objects) that were detected based on the scan operation.

In some cases, it is possible that the number of detected objects in the captured image exceeds the preset number. The messaging client application 104 is configured to select at least the selected object for display, and select from among remaining objects to meet the preset number of object names for display.

In other cases, it is possible that the number of detected objects (e.g., physical objects) in the captured image is less than the preset number. The messaging client application 104 is configured to select the detected, physical objects (e.g., humans and/or parts thereof, animals and/or parts thereof, non-living objects, etc.) for part of the preset number. Moreover, the messaging client application 104 is configured to identify additional, non-physical objects for the remaining part of the preset number. By way of non-limiting example, non-physical objects include an indication of current weather (e.g., temperature, wind), day/time, light conditions (e.g., as captured within the image), environmental conditions, and the like.

Thus, after selecting the preset number of objects (physical and/or non-physical), the messaging client application 104 displays the names of the objects corresponding to the preset number. In one or more implementations, the names are displayed in a sequential manner, over a duration of the scan operation.

In one or more implementations, a scan operation is set to a fixed duration (e.g., such that it completes in five seconds). Moreover, the scan operation may be committed to complete in response to a user gesture of a threshold time (e.g., one second). For example, a press-and-hold gesture that lasts at least one second results in the five-second scan to complete, even in a case where the user releases the gesture prior to five seconds.

Using the example of a five-second scan, a one-second user gesture threshold, and a preset number of object names set to three, the messaging client application 104 may display object names as follows: from seconds 0-2, the messaging client application 104 does not display any object names (e.g., allowing for the messaging client application 104 and messaging server system 110 to perform the above-described processing for identifying objects and/or identifying augmented reality content items); from seconds 2-3, the messaging client application 104 displays the name of a first identified object; from seconds 3-4, the messaging client application 104 displays the name of a second identified object; and from seconds 4-5, the messaging client application 104 displays the name of a third identified object (e.g., the selected object, since it is displayed last). In this manner, the end user is provided with an experience which iterates through the names of identified objects, and displays the name of the selected object last.

Thus, at block 620, the messaging client application 104 displays the image data captured by the device camera together with the identified augmented reality content item (e.g., corresponding to the selected object). As discussed below with respect to FIGS. 7A-7B, based on the above-noted ranking information provided by the database 122, the messaging client application 104 may provide the remaining augmented reality content item(s) (e.g., corresponding to augmented reality experiences) within a carousel interface, for example, in ranked order.

Figure 7:
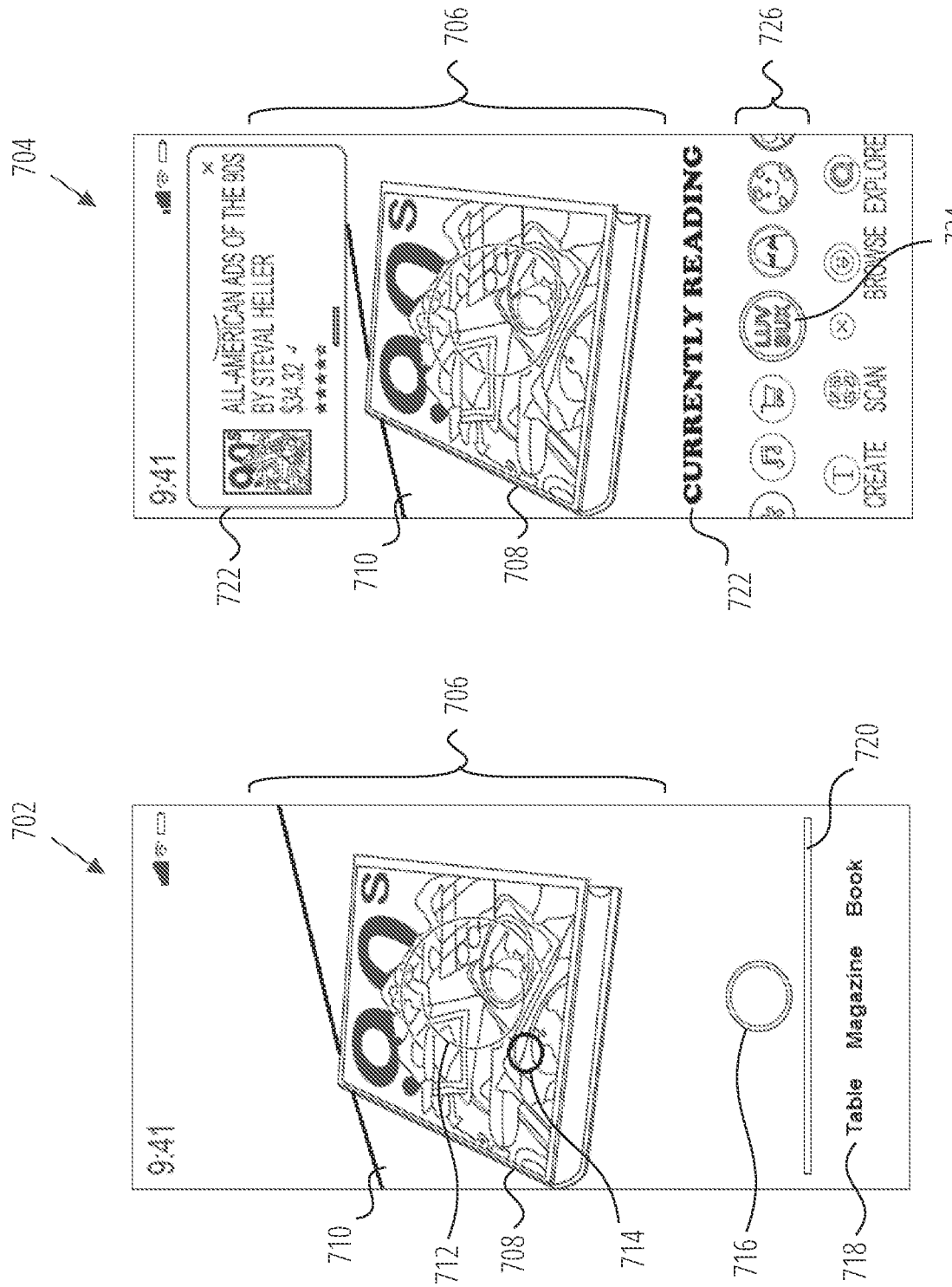
FIGS. 7A-7B illustrate user interfaces for displaying the names of objects identified in a captured image, in accordance with some example embodiments.

FIGS. 7A-7B illustrate a user interface 702 and a user interface 704 for displaying the names of objects identified in a captured image in association with displaying augmented reality content, in accordance with some example embodiments. For example, the user interface 702 and the user interface 704 are displayed within the messaging client application 104. The user interface 702 of FIG. 7A illustrates displaying the names of identified objects, and the user interface 704 of FIG. 7B illustrates displaying a selected augmented reality content item with captured image data.

In the example of FIG. 7A, the user interface 702 includes a captured image 706 corresponding to an image captured by a rear-facing camera of the client device 102. Alternatively, the captured image 706 may be captured by a front-facing camera of the client device 102. In one or more embodiments, the user interface 702 includes a button 716, user selection of which provides for generating a message with an image (e.g., in response to a press/tap gesture of the button 716) and/or a video (e.g., in response to a press-and-hold gesture of the button 716) of the screen content, for example, to send to friends, include in a Story, and the like.

As discussed above, the user of the client device 102 may provide touch input 714 to the messaging client application 104 to perform a scan operation to identify objects in the captured image 706. For example, the touch input 714 input corresponds to a press-and-hold gesture (e.g., of at least one second) at a predefined portion of the user interface 702 (e.g., a portion of the device screen in which the captured image 706 is being displayed).

In one or more implementations, during the scan operation, the messaging client application 104 is configured to display a scanning graphic 712 to indicate that the messaging client application 104 is performing a scan operation. For example, the scanning graphic 712 corresponds to an animation that is displayed for the duration of the scan (e.g., the predetermined duration of 5 seconds).

In addition, the messaging client application 104 is configured to display a progress indicator 720 in an animated manner during the scan operation. For example, the progress indicator 720 is initially displayed at a small size (e.g., when the scan initiates), and gradually extends to a full size/final state by completion of the scan operation.

Moreover, as noted above, the messaging client application 104 is configured to display names of a preset number of objects (e.g., three objects) identified based on the captured image. In the example of FIG. 7A, the object names 718 include "table" corresponding to table object 710, "magazine" corresponding to a magazine object (not shown), and "book" corresponding to book object 708. The object names 718 are displayed in an iterative manner, with the selected object (e.g., book object 708) being displayed last. For example, the name "table" may be displayed first, followed by the name "magazine," and then followed by the name "book."

In this regard, the book object 708 may have been selected from among all three objects, based a determination that there are more (e.g., a largest number of) augmented reality content items corresponding to a book than for a magazine and/or or a table. As noted above, such determination may be based on a comparison of object attributes with attributes/predefined words of augmented reality content items).

Turning to FIG. 7B, the messaging client application 104 displays the user interface 704 upon completion of the scan operation. As discussed above, the messaging server system 110 searches for and select(s) one or more augmented reality content items based on attribute(s) of the book object 708, and provides an indication of the augmented reality content items and/or ranking information to the messaging client application 104. The messaging client application 104 then identifies an augmented reality content item 722 (e.g., highest-ranked), and displays the augmented reality content item 722 together with the captured image 706. For example, the augmented reality content item 722 may correspond to an application configured to provide identifying information for a book. In the example of FIG. 7B, the augmented reality content item 722 displays the phrase "currently reading" to indicate that the augmented reality content relates to a book, and further displays supplemental information (e.g., a card element with author, availability, etc.) for the book object 708. The supplemental information may correspond to a user-selectable link for redirecting to a third-party application for additional information regarding and/or the ability to purchase, the book.

Moreover, the user interface 704 includes a carousel interface 726 which allows the user to cycle through and/or select a different augmented reality content item to apply/display with respect to the captured image 706. Each of the available augmented reality content items is represented by an icon which is user-selectable for switching to the respective augmented reality content item. The icons may be displayed in ranked order, based on the above-described ranking of augmented content reality items for the book object 708.

In one or more embodiments, the icon corresponding to the active augmented reality content item (e.g., selected augmented reality content item icon 724) is displayed in a different manner relative to (e.g., larger than) the remaining icons. Moreover, user selection of the selected augmented reality content item icon 724 provides for generating a message which includes an image (e.g., in response to a press/tap gesture of the selected augmented reality content item icon 724) and/or a video (e.g., in response to a press-and-hold gesture of the selected augmented reality content item icon 724) of the screen content, for example, to send to friends, include in a Story, and the like.

It is noted that FIGS. 7A-7B correspond to examples of augmented reality content items that may be selected based on a user request to perform a scan operation. Other examples of selecting/ranking augmented reality content items are discussed as follows.

In one example, the messaging client application 104 performs a scan operation and selects a food object, from among other objects, identified in a captured image. The messaging client application 104 in conjunction with the messaging server system 110 retrieves an augmented reality content item that includes one or more graphical elements that look like the food item (e.g., animated images of hamburgers and/or objects associated with hamburgers). The messaging client application 104 presents the one or more graphical elements around the food item or on top of the food item. The one or more graphical elements may be animated to appear to be circling around the food item.

In another example, the messaging client application 104 performs a scan operation and selects a movie/media object, from among other objects, identified in a captured image. The messaging client application 104 in conjunction with the messaging server system 110 retrieves an augmented reality content item that includes information and/or graphical elements that are associated with the movie/media object. The messaging client application 104 presents the information and/or graphical elements around the movie/media object or on top of the movie/media object. For example, if cover art includes a picture of a lion, the augmented reality content item includes a graphical element that animates a lion and replaces the picture of the lion in the cover art with the animated lion of the graphical element.

In another example, the messaging client application 104 performs a scan operation and selects a landscape object (e.g., including the sky), from among other objects, identified in a captured image. The messaging client application 104 in conjunction with the messaging server system 110 provide current weather information for the depicted landscape. The current weather information may be based at least partially on a geographical location of the client device 102. The selected augmented reality content item provides one or more graphical elements that depict the weather, and the messaging client application 104 presents the one or more graphical elements on top of the landscape (e.g., including the sky).

Figure 8:
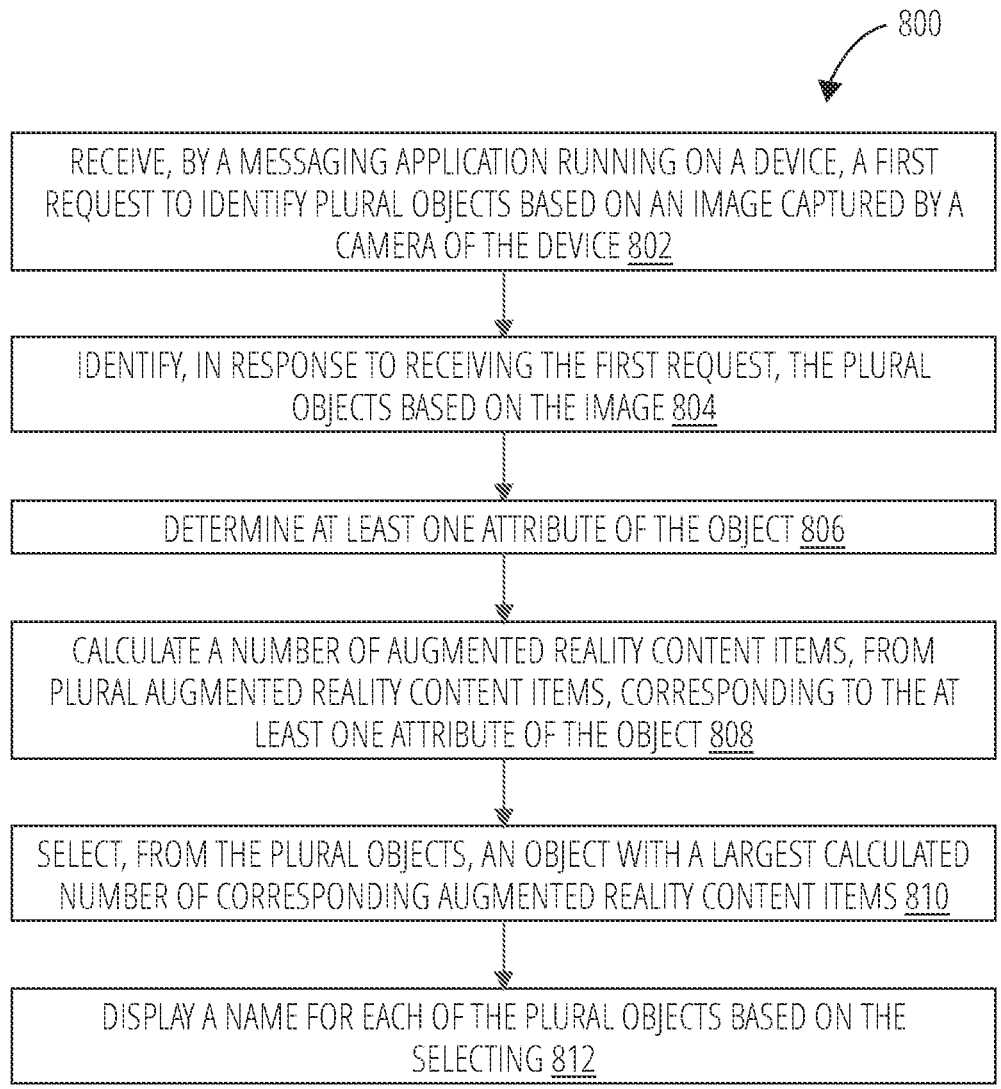
FIG. 8 is a flowchart illustrating a process for displaying the names of objects identified in a captured image in association with displaying augmented reality content, in accordance with some example embodiments.

FIG. 8 is a flowchart illustrating a process 800 for displaying the names of objects identified in a captured image in association with displaying augmented reality content, in accordance with some example embodiments. For explanatory purposes, the process 800 is primarily described herein with reference to the messaging client application 104 of the client device 102, and the messaging server system 110 of FIG. 1. However, one or more blocks (or operations) of the process 800 may be performed by one or more other components, and/or by other suitable devices. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, the messaging client application 104 receives a first request (e.g., based on a press-and-hold gesture) to identify plural objects based on an image captured by a camera of the client device 102. The messaging client application 104 identifies, in response to receiving the first request, the plural objects based on the image (block 804).

The identifying may include detecting a preset number of objects based on the image. Each of the plural objects (e.g., of the preset number) may correspond to a physical object identified in the image. Alternatively, at least one of the plural objects may correspond to a non-physical object associated with the image, based on a determination that a number of physical objects identified in the image is less than the preset number of objects.

For each of the plural objects, the messaging client application 104 determines at least one attribute of the object (block 806), and calculates a number of augmented reality content items, from plural augmented reality content items, corresponding to the at least one attribute of the object (block 808). The messaging client application 104 selects, from the plural objects, an object with a largest calculated number of corresponding augmented reality content items (block 810).

The messaging client application 104 displays a name for each of the plural objects based on the selecting (block 812). The displaying may include displaying the name of the selected object after the names of plural objects other than the selected object have been displayed.

The messaging client application 104 may identify, from the augmented reality content items corresponding to the selected object, an augmented reality content item based on the at least one attribute of the selected object, and display the image captured by the camera with the identified augmented reality content item. Identifying the augmented reality content item may include sending, to the messaging server system 110, a second request to rank the plural augmented reality content items based on the at least one attribute of the selected object, and receiving, from messaging server system 110 and based on sending the second request, an indication of the augmented reality content item. The messaging server system 110 may be configured to rank the plural augmented reality content items by comparing the at least one attribute of the selected object with predefined attributes associated with each of the plural augmented reality content items.

Figure 9:
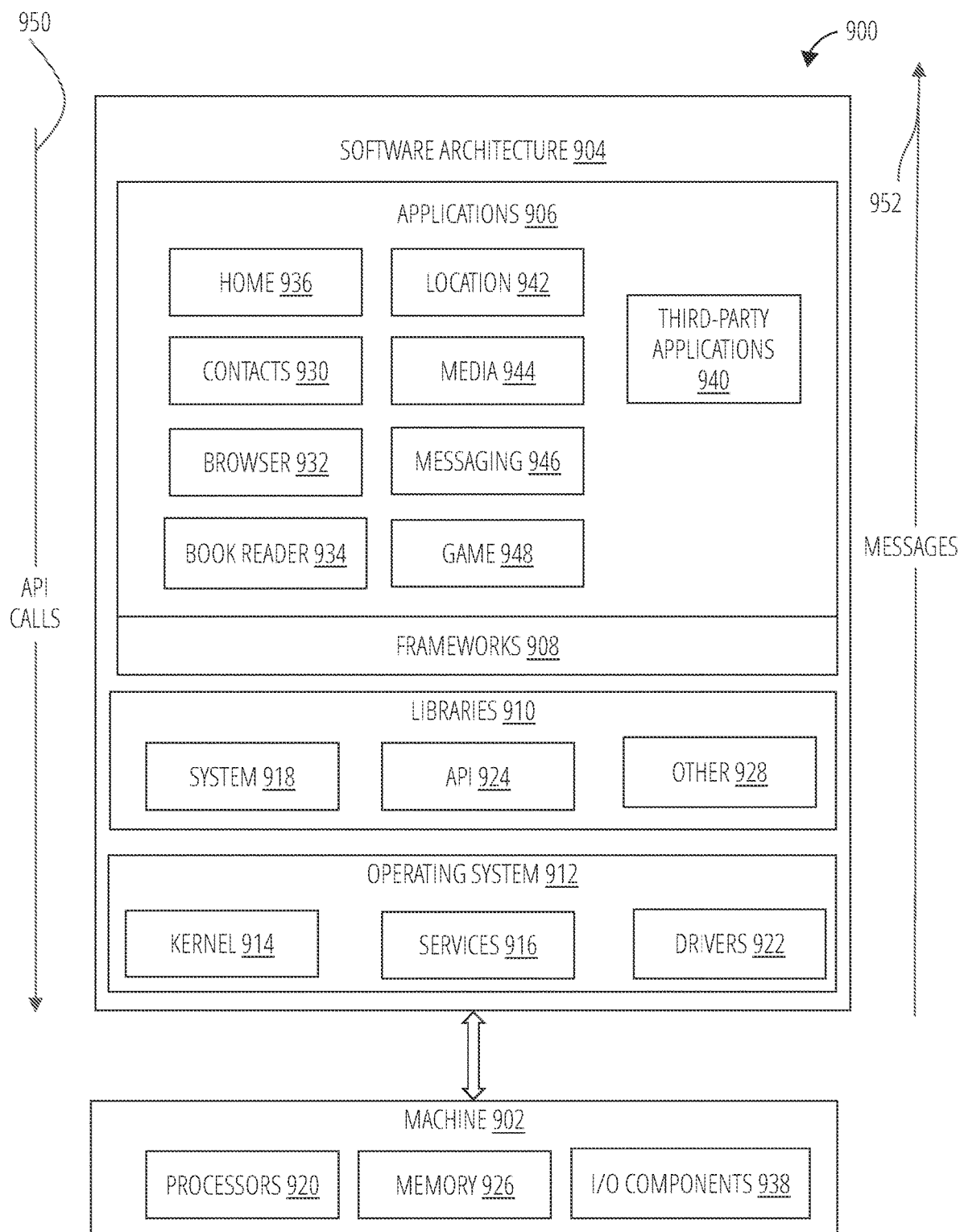
FIG. 9 is block diagram showing a software architecture within which the present disclosure may be implemented, in accordance with some example embodiments.

FIG. 9 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionality. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 910 provide a low-level common infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a high-level common infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example embodiment, the applications 906 may include a home application 936, a contacts application 930, a browser application 932, a book reader application 934, a location application 942, a media application 944, a messaging application 946 (e.g., corresponding to the messaging client application 104), a game application 948, and a broad assortment of other applications such as third-party applications 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party applications 940 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 940 can invoke the API calls 950 provided by the operating system 912 to facilitate functionality described herein.

Figure 10:
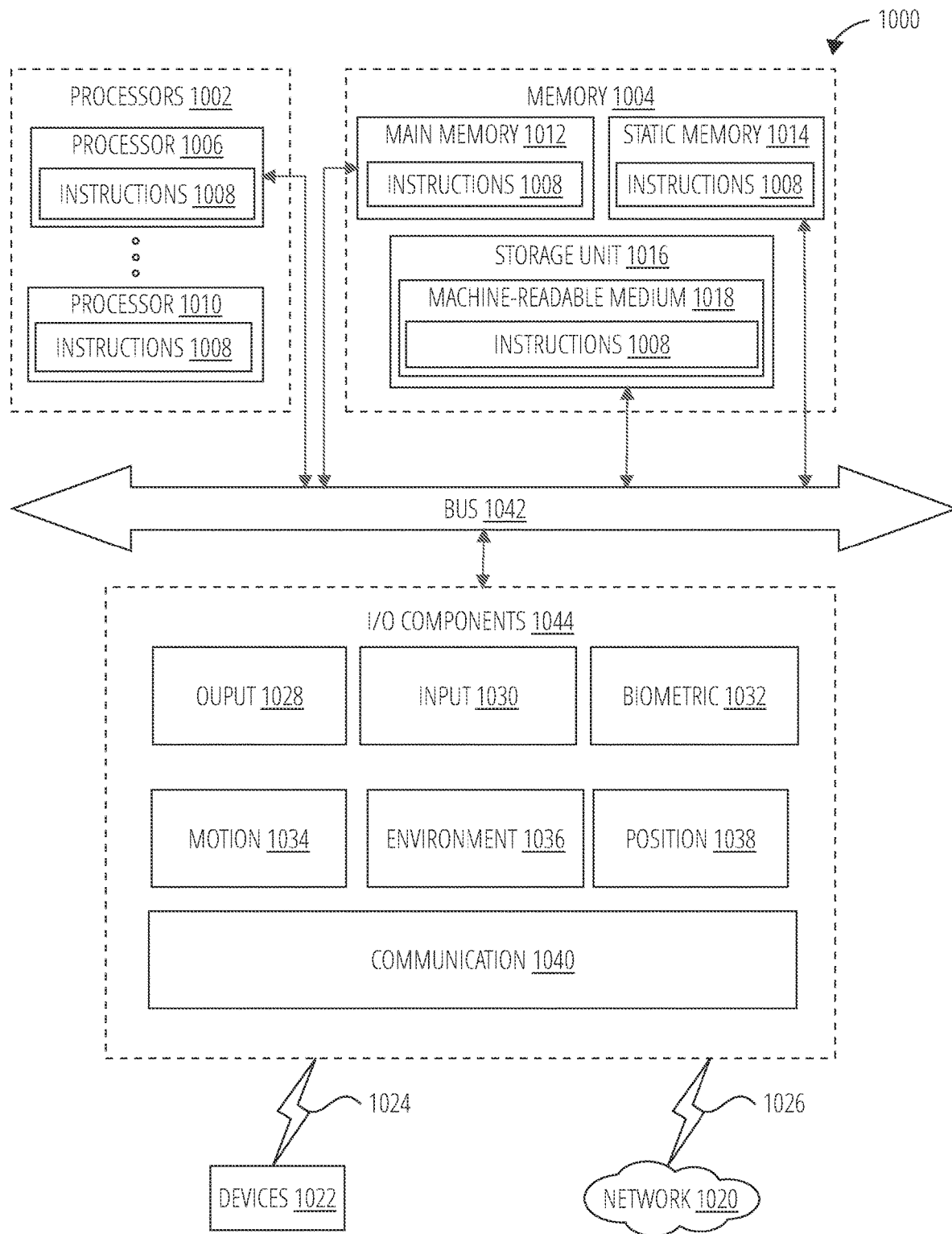
FIG. 10 is a diagrammatic representation of a machine, in the form of a computer system within which a set of instructions may be executed for causing the machine to perform any one or more of the methodologies discussed, in accordance with some example embodiments.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1044, which may be configured to communicate with each other via a bus 1042. In an example embodiment, the processors 1002 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, both accessible to the processors 1002 via the bus 1042. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the processor's cache memory), or any suitable combination thereof, during execution thereof by the machine 1000.

The I/O components 1044 may include a wide variety of components to receive input, provide output, produce output, transmit information, exchange information, capture measurements, and so on. The specific I/O components 1044 that are included in a particular machine will depend on the type of machine. For example, portable machines such as mobile phones may include a touch input device or other such input mechanisms, while a headless server machine will likely not include such a touch input device. It will be appreciated that the I/O components 1044 may include many other components that are not shown in FIG. 10. In various example embodiments, the I/O components 1044 may include output components 1028 and input components 1030. The output components 1028 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1030 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), optical sensor components (e.g., a camera) and the like.

In further example embodiments, the I/O components 1044 may include biometric components 1032, motion components 1034, environmental components 1036, or position components 1038, among a wide array of other components. For example, the biometric components 1032 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor components (e.g., accelerometer), gravitation sensor components, rotation sensor components (e.g., gyroscope), and so forth. The environmental components 1036 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1044 further include communication components 1040 operable to couple the machine 1000 to a network 1020 or devices 1022 via a coupling 1026 and a coupling 1024, respectively. For example, the communication components 1040 may include a network interface component or another suitable device to interface with the network 1020. In further examples, the communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface component included in the communication components 1040) and using any one of a number of well-known transfer protocols (e.g., hypertext transfer protocol (HTTP)). Similarly, the instructions 1008 may be transmitted or received using a transmission medium via the coupling 1024 (e.g., a peer-to-peer coupling) to the devices 1022.

A "client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

A "communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

A "component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

A "computer-readable medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

An "ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

A "machine-storage medium" refers to a single or multiple storage devices and/or media (e.g., a centralized or distributed database, and/or associated caches and servers) that store executable instructions, routines and/or data. The term shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

A "processor" refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

A "signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method, comprising:
   receiving, by a messaging application running on a device, a first request to identify plural objects based on an image captured by a camera of the device;
   identifying, in response to receiving the first request, the plural objects based on the image;
   for each of the plural objects,
      determining at least one attribute of the object, and
      searching a set of available augmented reality content items to determine a subset of augmented reality content items having the at least one attribute of the object;
   selecting, based on the searching for each of the plural objects, an object from the plural objects with a largest subset of augmented reality content items; and
   causing display of an iteration through each name of the plural objects, wherein the name of the selected object is displayed last in the iteration.

2. The method of claim 1, wherein the identifying comprises detecting a preset number of objects based on the image.

3. The method of claim 2, wherein each of the plural objects corresponds to a physical object identified in the image.

4. The method of claim 2, wherein at least one of the plural objects corresponds to a non-physical object associated with the image, based on a determination that a number of physical objects identified in the image is less than the preset number of objects.

5. The method of claim 1, further comprising:
   identifying, from the augmented reality content items corresponding to the selected object, an augmented reality content item based on the at least one attribute of the selected object; and
   displaying the image captured by the camera with the identified augmented reality content item.

6. The method of claim 5, wherein identifying the augmented reality content item comprises:
   ranking the plural augmented reality content items based on the at least one attribute of the selected object; and
   identifying the augmented reality content item based on the ranking.

7. The method of claim 6, wherein the ranking comprises comparing the at least one attribute of the selected object with predefined attributes associated with each of the plural augmented reality content items.

8. The method of claim 1, wherein each augmented reality content item in the set of available augmented reality content items is configured to transform content within the image captured by the camera.

9. The method of claim 1, wherein the iteration corresponds with iteratively displaying each of the names of the plural objects for a first predefined amount of time.

10. The method of claim 9, wherein the iteration corresponds with waiting a second predefined amount of time before iteratively displaying each of the names of the plural objects for the first predefined amount of time.

11. A device, comprising:
a processor; and
a memory storing instructions that, when executed by the processor, cause the processor to:
receive, by a messaging application running on a device, a first request to identify plural objects based on an image captured by a camera of the device;
identify, in response to receiving the first request, the plural objects based on the image;
for each of the plural objects,
determine at least one attribute of the object, and
search a set of available augmented reality content items to determine a subset of augmented reality content items having the at least one attribute of the object;
select, based on the searching for each of the plural objects, an object from the plural objects with a largest subset of augmented reality content items; and
cause display of an iteration through each name of the plural objects, wherein the name of the selected object is displayed last in the iteration.

12. The device of claim 11, wherein the identifying comprises detect a preset number of objects based on the image.

13. The device of claim 12, wherein each of the plural objects corresponds to a physical object identified in the image.

14. The device of claim 12, wherein at least one of the plural objects corresponds to a non-physical object associated with the image, based on a determination that a number of physical objects identified in the image is less than the preset number of objects.

15. The device of claim 11, wherein the instructions further cause the processor to:
identify, from the augmented reality content items corresponding to the selected object, an augmented reality content item based on the at least one attribute of the selected object; and
display the image captured by the camera with the identified augmented reality content item.

16. The device of claim 15, wherein identifying the augmented reality content item comprises:
rank the plural augmented reality content items based on the at least one attribute of the selected object; and
identify the augmented reality content item based on the ranking.

17. The device of claim 16, wherein the ranking comprises comparing the at least one attribute of the selected object with predefined attributes associated with each of the plural augmented reality content items.

18. A non-transitory computer-readable storage medium, the computer-readable storage medium including instructions that when executed by a computer, cause the computer to:
receive, by a messaging application running on a device, a first request to identify plural objects based on an image captured by a camera of the device;
identify, in response to receiving the first request, the plural objects based on the image;
for each of the plural objects,
determine at least one attribute of the object, and
search a set of available augmented reality content items to determine a subset of augmented reality content items having the at least one attribute of the object;
select, based on the searching for each of the plural objects, an object from the plural objects with a largest subset of augmented reality content items; and
cause display of an iteration through each name of the plural objects, wherein the name of the selected object is displayed last in the iteration.

* * * * *